Aug. 15, 1967     D. J. PARKER ET AL     3,335,484

METHOD AND APPARATUS FOR FLANGING THERMOPLASTIC LINED PIPE

Filed June 5, 1964     2 Sheets-Sheet 1

INVENTORS.
Donald J. Parker
Eugene J. Bourasso
Walter H. West
BY
ATTORNEY

INVENTORS.
Donald J. Parker
Eugene J. Bourasso
Walter H. West
BY
ATTORNEY

United States Patent Office 3,335,484
Patented Aug. 15, 1967

3,335,484
METHOD AND APPARATUS FOR FLANGING THERMOPLASTIC LINED PIPE
Donald J. Parker, Midland, Eugene J. Bourasso, Linwood, and Walter H. West, Bay City, Mich., assignors to The Dow Chemical Company, Midland, Mich., a corporation of Delaware
Filed June 5, 1964, Ser. No. 372,780
5 Claims. (Cl. 29—157)

This invention relates to an apparatus and a method for the formation of flanges on the lining of a pipe having a synthetic resinous thermoplastic liner. It more particularly relates to an apparatus and method for the flanging of the liner of such pipes in the field.

Many varieties of pipe employing thermoplastic resinout liners are employed in operations where chemical resistance of the conduit or pipe is required. In most applications it is desirable that the contents of the pipe should come in contact only with the liner. In connecting lengths of such pipe it is therefore customary to provide liner-to-liner contact. This has been accomplished in a variety of manners and means. However, in most applications where thermoplastic resinous liners are utilized in a piping system it is necessary to employ a means of joining the pipe which does not require high temperatures which would destroy or deform the lining material. Therefore a bolted flange is most often applied, although in certain instances beneficially a union is utilized. Usually when such a piping system is installed the dimensions of the sections of pipe must be known and the pipe manufactured to a suitable length having appropriately flanged liners and then the prefabricated pipe is shipped to the point of installation.

Certain methods oftentimes employ the removal of a portion of the pipe to leave a projecting portion of a thermoplastic resinous liner which is heated to a thermoplastic condition and subsequently flanged. Usually such an operation requires equipment which is relatively heavy and bulky and does not permit suitable tools to accomplish the flanging to be stored or carried by a pipe fitter who is installing plastic lined pipe.

It is an object of this invention to provide a method and apparatus which permits field fabrication of thermoplastic resinous lined pipe.

A further object of this invention is to provide a method and apparatus which permits the flanging of the liner of a thermoplastic resinous lined pipe without significant heat damage to the portion of the liner being formed into the flange.

Another object of the invention is to provide a method and apparatus for the fabrication of flanged end portions of the thermoplastic resinous liner of the lined pipe wherein the strentgh of the liner adjacent to the flange is not seriously reduced.

It is an object of this invention to provide an improved method and apparatus for the flanging of thermoplastic resinous lined pipe which employs tools which are sufficiently small to permit incorporation in a pipe fitter's tool kit.

These benefits and other advantages in accordance with the present invention are achieved in a method of flanging the liner of a thermopalstic resinous lined pipe comprising removing of a portion of the pipe having a generally cylindrical configuration adjacent at least one end of the pipe to leave a generally cylindrical portion of the liner extending therefrom applying to the terminal portion of the pipe a flange having a radially extending surface adjacent to the extending portion of the lining, the improvement which comprises generally uniformly heating the extending portion of the liner until the portion is in a heat plastified condition by means of circulating in a generally axial direction heated gas about the surface of the extending portion of the pipe wherein the heated gas contacts the extending portion of the liner first generally adjacent the outer surface thereof adjacent the pipe and flange and the air moved axially along the portion of the pipe whereupon its direction of flow is reversed and the heated air is passed into the interior of the pipe and discharged therefrom through an opening remote from the end of the pipe being flanged, forcing the extending portion of the liner into a generally radially extending configuration while in a heat plastified condition and subsequently cooling the radially extended portion of the liner below the heat plastifying temperature thereof.

The method of the present invention is advantageously practiced by employing apparatus comprising in cooperative combination a source of a hot gas such as hot air having a conduit thereon, the conduit terminating in a housing having a generally circular configuration and adapted to engage a flange on the pipe and surround an extending portion of a pipe lining sufficient to form a flange, a baffle disposed within the housing, the baffle having a generally cup-like configuration, the baffle having an open end and a closed end, the open end of the baffle being adapted to receive the extended portion of the thermoplastic resinous lining of a pipe and positioned within the housing in such a manner that a generally annular passage is formed between the housing and the baffle and when the housing is in engagement with a pipe flange supported on a pipe having a generally cylindrical portion of the lining extended therefrom, a second generally annular passage is formed between the inner surface of the baffle and the extending portion of the lining, the first and second annular passages being in communication with each other and the second annular passage being in communication with the space enclosed by the extending thermoplastic resinous liner portion, the heater adapted to cooperate with a liner supporting device comprising a generally cylindrical body defining a plurality of fingers which are resiliently urged outwardly from the cylindrical configuration, the liner supporting device adapted to slide freely within the lining of a pipe being flanged, the fingers so constructed and arranged as to support the thermoplastic resinous liner portion while being heated, the fingers having formed thereon a plug contacting surface, the plug contacting surface adapted to cooperate with a flange forming device comprising a yoke or body portion adapted to engage and be retained by a flange on a thermoplastic resinous lined pipe whose liner is to be flanged, the yoke reciprocally supporting a mandrel or die support which is adapted to move generally along the axis of a pipe when the device is supported by a pipe flange, the mandrel supporting a forming die, the forming die comprising a plug adapted to be inserted into the interior of the extending thermoplastic resinous pipe lining and engage the generally cylindrical pipe lining support, a forming die comprising a generally radially extended body defining a forming surface so constructed and arranged so as to engage the heat plastified thermoplastic resinous extending portion of the thermoplastic resinous lined pipe and on being advanced toward the flange of the pipe forming a generally radially extending flange on the thermoplastic resinous pipe liner.

Further features and advantages of the invention will become more apparent from the following specification when taken in connection with the drawing wherein.

Figure 1:
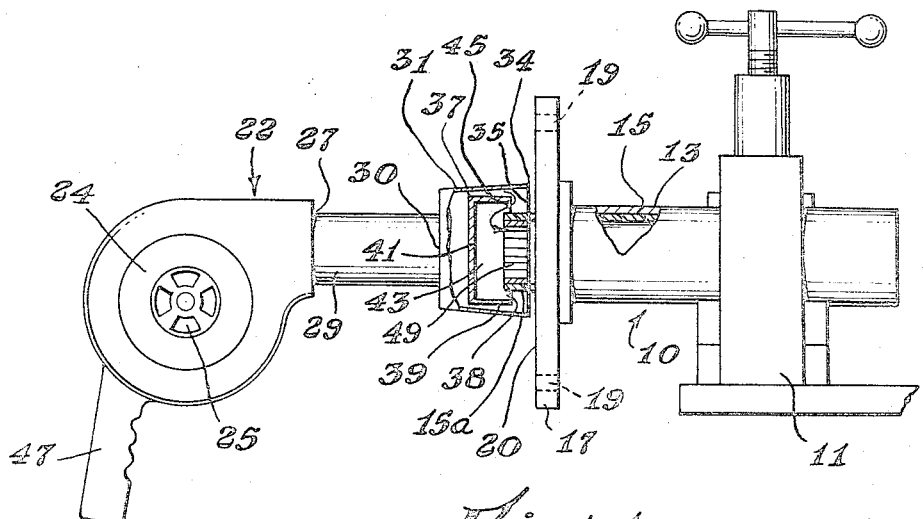
FIGURE 1 depicts a partly in section view of a heating device in accordance with the present invention.

In FIGURE 1 there is illustrated a partly in section view of a thermoplastic resinous lined pipe 10 rigidly positioned in a support or pipe vise 11, the pipe 10 comprises a cylindrical metal body or pipe 13 having disposed therein a hollow cylindrical thermoplastic resinous liner 15 and the liner 15 has a generally cylindrical protruding or extending portion 15a. The terminal portion of the pipe 10 has rigidly affixed to the metal pipe 13 a flange 17 having disposed therein means for attachment or bolt holes 19. The flange 17 has a generally radially extending face 20 adapted to be disposed adjacent a like face for the connection of two sections of the pipe. A hot gas source 22 is disposed generally adjacent the face 20 of the flange 17. The heat source 22 comprises a blower or air pump 24 having an adjustable intake 25 and a discharge portion 27. Generally adjacent to and in full communication with the discharge portion 27 is an air heater 29 having a discharge 30. The discharge 30 is arranged generally coaxial with the axis of the pipe 10. The discharge of the heated gas source 29 is in full communication with a housing 31. The housing 31 has a terminal portion 34 which defines an aperture 35. The terminal portion 34 is adapted to engage the surface 20 of the flange 17 and minimize any flow of hot gas to the external surface of the housing 31. Generally coaxially supported within the housing 31 is a baffle 37. The baffle 37 has a generally cup-like configuration and defines an opening 38 disposed generally adjacent and coaxial with the opening 35. The baffle 37 and the housing 31 define a generally annular passageway 39 therebetween. The baffle 39 has a closed end portion 41. The cup-like baffle encloses a space 43 which is of sufficient magnitude to receive the extending thermoplastic resinous portion 15a of the liner 15 of the pipe 10. The baffle 37 defines a generally annular passageway 45 between the inner surface thereof and the exterior generally cylindrical surface of the portion 15a. The entire assembly 22 is provided with a support means or handle 47. Disposed within the pipe liner 15 and the extending portion thereof 15a is a support member 49. The support member 49 is slidably maintained within the liner and its outer diameter approximates the inner diameter of the liner.

Figure 2:
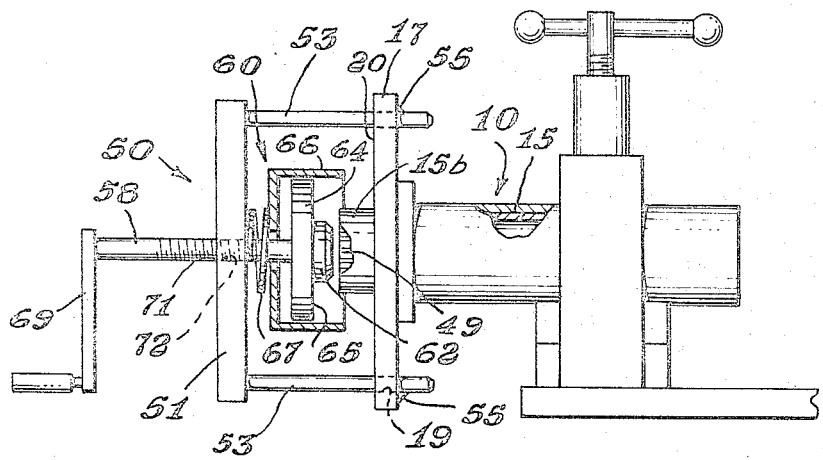
FIGURE 2 depicts a view of a lined pipe about to be flanged by a device in accordance with the present invention.

In FIGURE 2 there is illustrated a view of the pipe 10 in engagement with a flanging device 50 about to deform a heat plastified extending portion 15b of the thermoplastic resinous liner 15. The flanging device 50 comprises a yoke 51. The yoke 51 is provided with a plurality of arms 53 adapted to engage the bolt holes 19 of the flange 17. Within each arm 53 is disposed a resiliently positioned locking means 55 adapted to engage the surface of the flange 17 remote from the surface 20 and prevent withdrawal of the yoke arms 53 from the bolt holes 19. The yoke 50 has reciprocally mounted therein an arbor 58 adapted to be selectively positioned along the axis of the pipe 10. The arbor 58 carries a flanging means or die assembly 60 at the terminal portion of the mandrel generally adjacent the flange 17 and the yoke arms 53. The die assembly 60 comprises a plug 62 adapted to slide within the heat plastified portion 15b of the liner 15.

Generally adjacent to the plug is a molding member 64 having a radially extending face 65. Slidably mounted about the molding member 64 is a resiliently mounted sleeve 66 which has a generally circular configuration and is supported in such a manner that it is slidable along the axis of the mandrel and is resiliently urged toward the side of the molding member 64 remote from the face 65 by means of the spring 67 which engages both the yoke 51 and the sleeve 66. The mandrel 58 is provided with an actuating means 69 to rotate the mandrel 58 which has a thread 71 on the surface thereof adapted to engage a mating thread 72 formed in the yoke 50 to advance or retract the mandrel 58 and the molding head 60 along the axis of the pipe and cause it to engage and disengage the heat plastified portion 15b.

Figure 3:
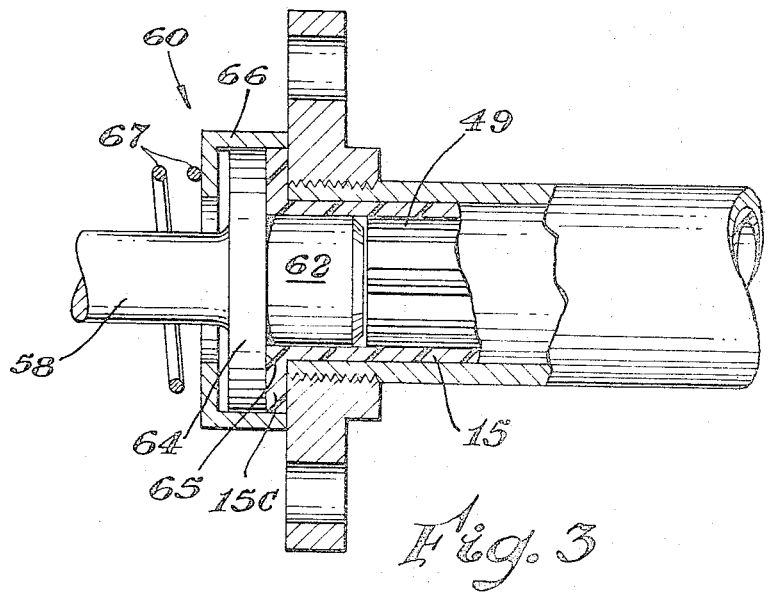
FIGURE 3 depicts a thermoplastic resinous liner of a pipe flanged and in engagement with the device shown in FIGURE 2.

FIGURE 3 depicts a partial view of the molding assembly 60 in engagement with a portion of the heat plastified thermoplastic resinous liner 15b wherein the portion 15b has been formed into a flange portion 15c. The portion 15c is a radially extending flange integral with the thermoplastic resinous liner 15.

Figure 4:
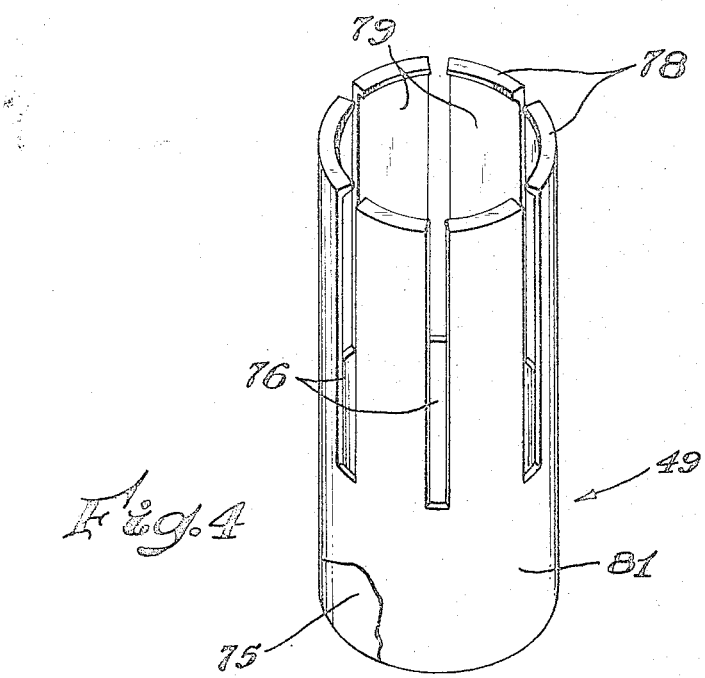
FIGURE 4 is a view of the liner support depicted in FIGURE 3.

FIGURE 4 is an isometric view of a support member 49 for use in the practice of the present invention. The support member 49 comprises a generally cylindrical body 75. The body 75 has formed therein a plurality of slots 76. Forming the edges of the slots 76 are a plurality of fingers 78. Each of the fingers 78 terminates an inwardly facing plug engaging portion 79. The body 75 has disposed thereon a coating of a heat resistant non-adhesive thermoplastic resinous material 81.

In the practice of the present invention a pipe to be terminated or flanged is supported, the metal pipe is cut through at a desired distance from the end to be flanged by means of a pipe cutter or saw which preferably does not permanently deform the metal pipe wall in the direction of the liner. The cut is made in such a way to sever a short length of pipe in the form of an annular ring corresponding in length to the desired length of the liner which is to be exposed for the formation of the liner flange. A flange is then secured to the pipe such as the flange 17 of FIGURE 1 is readily accomplished by threading or alternately by clamping. Welding techniques may be employed if done with sufficient care to prevent serious thermal decomposition of a portion of the liner within the pipe adjacent to the welding portion. However, for most practical purposes such a technique is generally not satisfactory. The heater 22 is then positioned in such a manner that the terminal portion 34 of the housing 31 is in engagement with the face 20 of the flange 17. Hot air from the hot air source 31 first impinges upon the surface 20 of the flange 17 and is then passed into the baffle 43 through the annular passageway 45 whereupon it then is discharged through the pipe. Advantageously the liner support 49 is inserted within the pipe prior to heating but if the pipe is supported in a rotatable manner wherein there is no difficulty involved with sagging of the liner the pipe support may be omitted. However, use of the pipe support assures a smooth streamline contour of the inner surface of the liner after molding. The support 49 assures that the plug 62 does not engage the terminal edge of the liner and form an undesired ridge or a deformed liner flange. Heating of the flange is continued until a suitable temperature is achieved. The precise length of time of heating will vary depending upon ambient temperature, thickness in composition of the lining, and the like. However, due to the versatility of the heating device it is quickly removed for inspection and evaluation of the extending portion of the liner by visual observation or the expedient of prodding the liner with an instrument such as a pencil or the like in order to determine if the suitable thermoplastic temperature has been achieved is readily possible.

When the suitable thermoplastic temperature is achieved, the flanging device such as the device 50 is quickly applied to the pipe flange by merely sliding the yoke arms 53 into the appropriate bolt holes and flange. The locking means 55 prevent the withdrawal of the yoke arms from the flange bolt holes until they are manually depressed or released. Rotation of the mandrel 58 in the appropriate direction advances the die assembly toward the heat plastified liner. The plug 62 engages the support 49 forcing it into the body of the pipe. As the die assembly is advanced the sleeve 66 engages the flange face 20, and the molding member 64 engages the heat plastified liner portion 15b, and distorts it in the manner illustrated in FIGURE 3 to form the readily extending liner flange 15c. The flanging device is maintained in position until a flanged portion 15c cools to a temperature below its thermoplastic temperatures and the device is removed by moving the mandrel 58 away from the flange and releasing the locking means and withdrawing the arms from the opening. The support 49 is removed from the pipe. The resultant flanges are smooth, uniform and are found emminently satisfactory.

Utilizing apparatus substantially as illustrated and described, thermoplastic resinous liners have been formed in various pipes of nominal sizes from 1–6 inches employing linings of polypropylene, saran, and chlorinated polyether material, commercially available under the trade name of "Penton," respectively. Pipe fitters, unfamiliar wtih the apparatus and its manipulation, usually are capable of flanging thermoplastic resinous liners in pipes with the apparatus and method of the invention after an instruction period of from about 30 to 45 minutes.

As is apparent from the foregoing specification, the apparatus and method of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. In a method of flanging the liner of a thermoplastic resinous lined pipe comprising removing a portion of the pipe having a generally cylindrical configuration adjacent at least one end of the pipe to leave a generally cylindrical portion of the liner extending therefrom, applying to the terminal portion of the pipe a flange having a radially extending surface adjacent to the extending portion of the lining, the improvement which comprises generally uniformly heating the extended portion of the liner until the portion is in a heat plastified condition by means of
circulating in a generally axially direction a heated gas about the surface of the extending portion of the pipe wherein the heating gas contacts the extending portion of the liner generally adjacent the outer surface thereof adjacent the pipe and flange and the gas moves axially along the portion of the extending portion of the pipe whereupon its direction of flow is reversed and the heated gas is passed into the interior of the pipe and discharged therefrom through an opening remote from the end of the pipe being flanged,
forcing the extending portion of the liner into a generally radially extending configuration while the liner is in a heat plastified condition and subsequently
cooling the radially extending portion of the liner below the heat plastifying temperature thereof.

2. The method of claim 1, including the step of internally supporting the extending portion of the liner during heating.

3. The method of claim 1, including the step of restraining the peripheral portion of the heat plastified liner by a generally cylindrical configuration during forming into a radially extending configuration.

4. The method of claim 3, wherein the heat plastified portion of the liner is conformed to a radially extending surface of the pipe flange.

5. An apparatus for flanging the liner of a thermoplastic resinous lined pipe, which liner is formed by removing a portion of the pipe having a generally cylindrical configuration adjacent to at least one end of the pipe thereby leaving a generally cylindrical portion of the liner extending therefrom, applying to the terminal portion of the pipe a flange having a radially extending surface adjacent to the extending portion of the lining, the improvement which comprises means to support a pipe having a thermoplastic resinous lining, a portion of the thermoplastic resinous lining extending beyond the termination of the pipe, a flange secured to the termination of the pipe adjacent the extending portion of the lining, a flange having a radially outwardly extending surface adjacent the extending portion of the flange,
a source of a hot gas having a conduit thereon, the conduit terminating in a housing having a generally circular configuration and adapted to engage the flange of the pipe supported in a pipe support means and surround an extending portion of a pipe lining,
a baffle disposed within the housing, the baffle having a generally cup-like configuration, the baffle having an open end and a closed end, the baffle being generally coaxial with the housing, the open end of the baffle being adapted to receive the extended portion of the pipe lining and positioned within the housing in such a manner that a generally annular passage is formed between the housing and the baffle and when the housing is in engagement with a pipe flange on a pipe supported by the pipe support means a second generally annular passage is formed between the inner surface of the baffle and the extending portion of the pipe lining, the first and second annular passages being in communication with each other and the second annular passage being in communication with the space enclosed by the extending thermoplastic resinous liner portion,
a liner supporting device comprising a generally cylindrical body defining a plurality of fingers which are resiliently urged outwardly from the cylindrical configuration, the liner supporting device being adapted to slide freely within the lining of the pipe being flanged, the fingers being so constructed and arranged so as to support a thermoplastic resinous liner portion of a pipe while being heated and having formed thereon a plug contacting surface, the plug contacting surface adapted to cooperate with
a flange forming device comprising a yoke adapted to engage and be retained by a flange on a thermoplastic resinous lined pipe whose liner is to be flanged, the yoke reciprocally supporting a mandrel which is adapted to move generally along the axis of a pipe when a device is supported by a pipe flange, the mandrel having secured thereto a forming die, the forming die adapted to cooperate with a pipe flange to form a cavity having the shape of a liner flange, the forming die comprising a plug adapted to be inserted into the interior of an extending thermoplastic resinous pipe lining and engage the plug contacting surface of the lining support, the forming die having a generally radially extending body immediately adjacent the plug and generally adjacent the yoke so constructed and arranged so as to engage a heat plastified thermoplastic resinous extending portion of the pipe liner and on being advanced toward the flange of the pipe forming a generally radially extending flange on the pipe liner and in engagement with a pipe flange.

(References on following page)

References Cited

UNITED STATES PATENTS

| | | |
|---|---|---|
| 2,608,501 | 8/1952 | Kimble. |
| 2,779,996 | 2/1957 | Tanis. |
| 2,823,418 | 2/1958 | Fritts. |
| 3,013,310 | 12/1961 | Foster. |
| 3,142,868 | 8/1964 | Blount. |

FOREIGN PATENTS

| | | |
|---|---|---|
| 141,671 | 7/1948 | Australia. |
| 573,711 | 3/1958 | Italy. |
| 379,832 | 1962 | Japan. |
| 135,313 | 1961 | Russia. |

ROBERT F. WHITE, *Primary Examiner.*

R. KUCIA, *Assistant Examiner.*